United States Patent [19]

Ehlscheid et al.

[11] Patent Number: 4,586,598

[45] Date of Patent: May 6, 1986

[54] METHOD AND APPARATUS FOR DELIVERING ARTICLES FROM A HIGH-SPEED PRODUCTION MACHINE

[75] Inventors: Günter Ehlscheid; Klaüs Münsch, both of Neuwied, Fed. Rep. of Germany

[73] Assignee: Winkler & Dunnebier Maschinenfabrik und Eisengiesserei GmbH & Co. KG, Neuwied, Fed. Rep. of Germany

[21] Appl. No.: 704,218

[22] Filed: Feb. 22, 1985

[30] Foreign Application Priority Data

Mar. 16, 1984 [DE] Fed. Rep. of Germany ....... 3409662

[51] Int. Cl.[4] ............................................. B65G 37/00
[52] U.S. Cl. .................................. 198/356; 198/483.1; 198/598; 198/377; 198/426
[58] Field of Search ............... 198/356, 372, 377, 411, 198/425; 198/478.1, 624, 484.1, 803.13, 483.1, 598, 803.10, 449, 426

[56] References Cited

U.S. PATENT DOCUMENTS

| Re. 27,190 | 10/1971 | Porcaro | 198/449 |
|---|---|---|---|
| 3,019,886 | 2/1962 | Winkler et al. | 198/803.1 |
| 3,837,474 | 9/1974 | Brooke | 198/377 |
| 3,871,274 | 3/1975 | Hornby | 198/377 |

FOREIGN PATENT DOCUMENTS

| 918594 | 1/1973 | Canada | 198/411 |
|---|---|---|---|
| 2702339 | 7/1978 | Fed. Rep. of Germany | 198/426 |

Primary Examiner—Joseph E. Valenza
Assistant Examiner—Kyle E. Shane
Attorney, Agent, or Firm—Collard, Roe & Galgano

[57] ABSTRACT

A method and apparatus for delivering articles from a high-speed production machine manufacturing hygienic articles, such as sanitary napkins, whereby the sanitary articles, which are separated from the production line and transported at high speed, are turned, aligned and slowed down successively, whereby the interval in the timed sequence of the articles is reduced significantly. Packs of the articles containing a preselected number of units are formed from the flow of sanitary articles so slowed down, and delivered for further processing.

12 Claims, 3 Drawing Figures

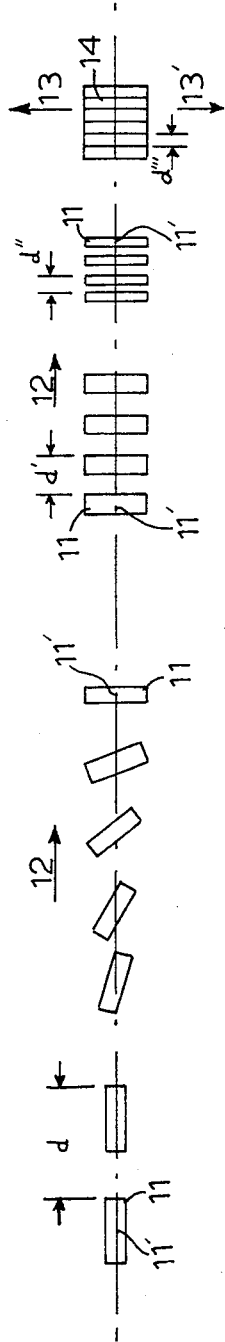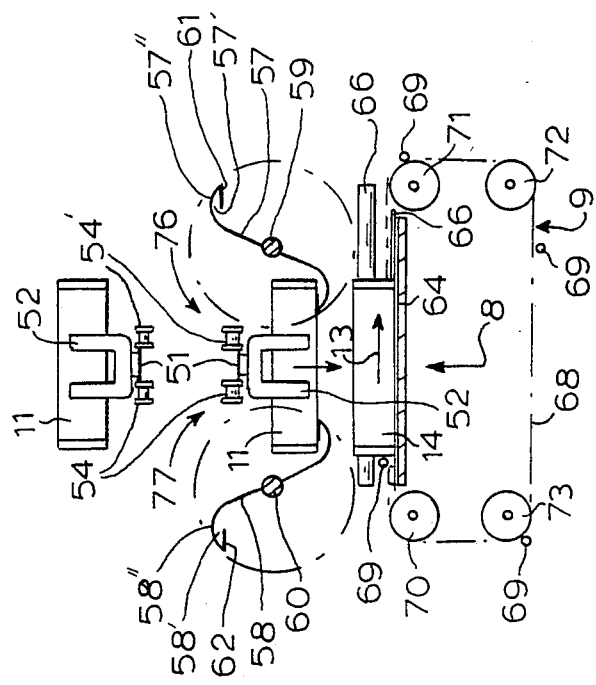

METHOD AND APPARATUS FOR DELIVERING ARTICLES FROM A HIGH-SPEED PRODUCTION MACHINE

The present invention relates to a method and apparatus for delivering articles from a high-speed production machine which manufactures sanitary articles such as sanitary napkins, tampons or the like and, more particularly, it relates to such a method and apparatus for delivering such articles from such a machine for packaging.

Sanitary or hygienic articles such as sanitary napkins or the like are currently manufactured with a maximum production output of 400 units/minute. In order to increase this production output while maintaining at least the same product quality, it is necessary to alter those areas in the machine where the production rate is inhibited.

With most known production machines, the individual sanitary articles which are separated from the production line or web are transported to the depositing station by a fan-type compartment chain. Such a compartment chain is particularly suitable for ejecting the product into packs and counted numbers because it reduces the spacing between the articles in the timed sequence of the operation, thereby significantly lowering their transport speed. However, in practice, serious problems are encountered time and again with respect to loading the articles in the compartment chain. Necessarily, the flow or motion of the articles is briefly halted because the direction of transport of the compartment chain is displaced in most cases by 90 degrees relative to the direction of transport up to this point. The articles entering the open compartments of the chain at high speed in the direction of their longitudinal axes rebound on contact with the chain, so that their positioning in the pockets of the chain is inexact, or the articles are not seized by the chain. This leads to breakdowns and prevents any increase in the production rate.

An attempt to solve this problem has been proposed by means of a device disclosed in German published patent disclosure DE-OS 27 02 339. According to this disclosure, the sanitary articles are guided on two planes one on top of the other by means of a distribution mechanism or switch and a rotor and loaded in the double-compartment chain in stacks of two units each with the help of a finger chain, in a direction displaced by 90 degrees as compared to the direction of conveyance up to this point in the production line, so that no problems are caused. However, the aforementioned problems do occur when the direction of transport is changed. Thus, the articles arriving at a high speed in the direction of their longitudinal axes must be stopped briefly, and problems are encountered due to rebounding. Also, with this known solution, the distribution or dividing switch is a source of trouble because the switch is used where the spacing between the individual units is extremely narrow. Another drawback is that only even numbered packs are obtainable with this device.

Another problem with presently available machines relates to the ejecting or pushing device which pushes the articles in counted numbers onto a depositing station. This device contributes to the output restriction in such machines. With the apparatus disclosed in DE-OS 27 02 339, the ejecting device is arranged on the bottom strand between the two synchronously operating chains of the double-compartment chain. The device is comprised of a pusher driven by eccentric disks for pushing the sanitary articles from the double-compartment chain. The eccentric drive is operated in such a way that the pusher moves not only in the downward direction in which the product is pushed out, but performing a circle, which means that the motion of the pusher experiences a relatively extensive displacement as compared to the sanitary articles being ejected, which, at high production rates, leads to unsafe ejection and often even to product damage.

Such prior art machines have another drawback, namely, to the extent that when the machine is restarted after a shutdown, such as at the start of another shift or after breakdowns or when changing to another product size, the first sanitary articles produced after restarting, which are usually produced with flaws or defects due to different tension in the web and different displacements, can be removed only as rejects at the depositing station. Articles produced with inexact dimensions and flaws, however, frequently cause problems while being conveyed to the depositing station, preventing quick acceleration of the machine to full production speed.

It is, therefore, the primary object of the present invention to substantially increase the product output of machines for manufacturing sanitary articles, namely beyond the presently attainable maximum output rate of 400 units/minute. This requires a new concept and approach in the design of that part of the machine that is known to inhibit its capacity, namely the part between where the articles are separated and the depositing station or packaging machine.

This object, as well as others which will hereinafter become apparent, is accomplished in accordance with the present invention by revolving or swiveling the sanitary articles, which are manufactured in a line or strand extending in the direction of their longitudinal axes, separated and transported at high speed, by 90°; subsequently decelerating the articles to a significantly lower speed and smaller spaced interval in synchronization with the timed cycle of the processing operation, with simultaneous alignment of the articles; then loading the articles safely and trouble-free in the compartment chain; and finally pushing the articles out of said chain by packs and in counted numbers onto the depositing station, said ejection taking place at the reversing lower strand of said chain with the help of two rotary wings disposed on either side of the compartment chain.

Specifically, the advantage gained with the present invention lies in the fact that the sanitary articles turned by 90 degrees are positioned with shorter spacings between the individual articles, which results in a significant and desirable reduction of the processing speed. At the lower speed, the sanitary articles can be safely and smoothly loaded in the compartment chain even at production rates exceeding 400 units/minute. Also, it is advantageous that a continuous product run is achieved and that the direction of transport is changed at the centers of gravity of the articles only after their transport speed has been highly reduced.

Moreover, a favorable feature is the product switch mechanism, which permits diverting and removing of the flawed or inexact articles produced in the restarting phase of the machine, which articles otherwise often cause trouble in the later stations of the machine. Likewise, the ejecting device with its rotary wings disposed on either side next to the reverse strand of the compartment chain is advantageous, because the rotary wings need to be indexed only by one half rotation per pushing cycle, thus permitting a smooth ejection of the sanitary article without any damage thereto. Between the ejection intervals, said rotary wings serve to support, from the bottom, the sanitary articles which are suspended downwardly in the bottom strand of the compartment chain. It is advantageous, furthermore, that the packs of articles are pushed out onto the receiving or depositing table always in preselected complete numbers. This is achieved by either indexing the compartment chain in cycles for complete loading, or by interrogating the number of units via a sensor if the compartment chain is driven continuously, and by not pushing incomplete packs onto the depositing table, but delivering such incomplete packs to a station for receiving rejects.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 2 is a schematic representation of the flow diagram demonstrating the method according to the present invention; and FIG. 3 is a sectional view along line 3—3 of FIG. 1.

Figure 1:
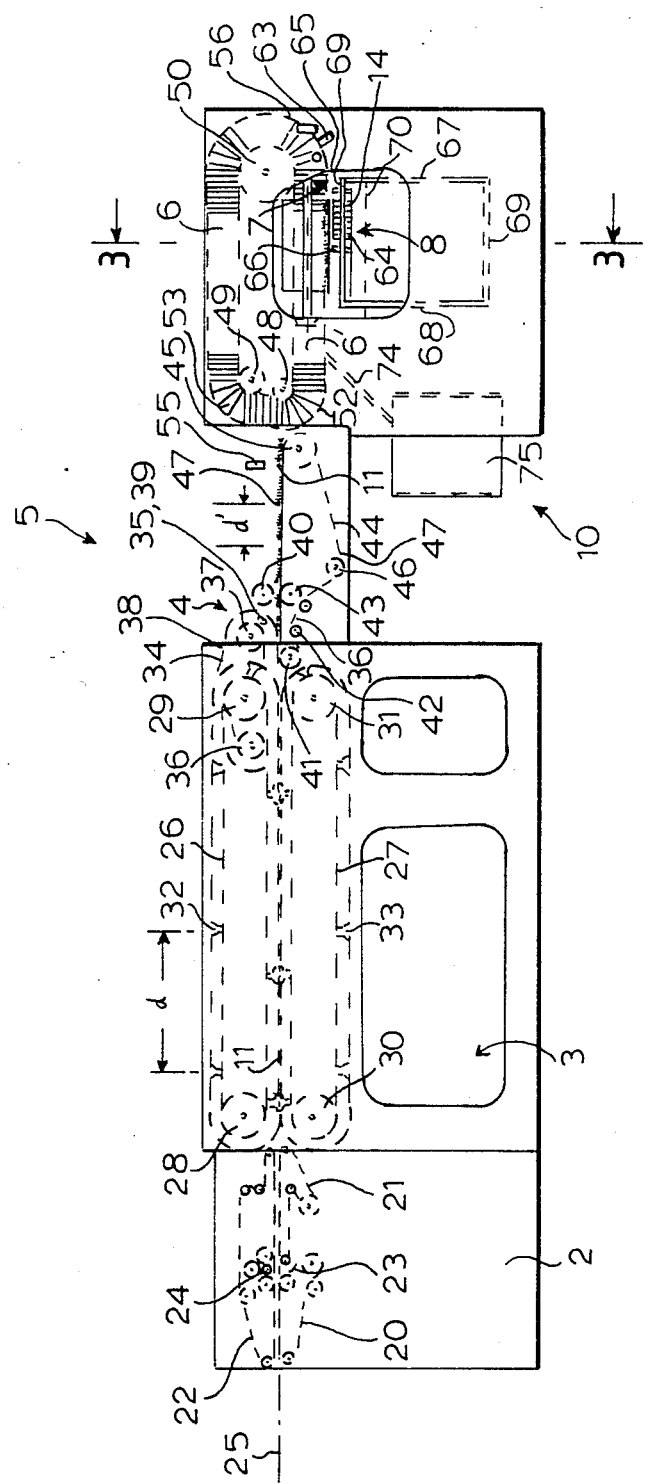
FIG. 1 is a schematic representation of a side view of the apparatus according to the present invention.

Now turning to the drawings, there is shown in FIG. 1 the machine end of a production machine for the manufacture of sanitary products, designated 11, comprised of a product switch 2, a revolving or swiveling device 3, a pulling device 4, a regulating device 5, a compartment chain 6, a pushing or ejecting device 7, a depositing station 8, a transverse conveying device 9 and a station 10 for receiving rejects. Sanitary articles 11 are passed through the devices, designated 1 to 9, in the above sequence and are then delivered to a packaging machine. FIG. 2 illustrates the flow of sanitary articles 11 after said articles have been separated from the production line or strand.

Sanitary articles 11 are transported in the direction of their longitudinal axes—which, in the present case, conforms to the direction of production 12—by way of a product switch 2 with a spacing interval d between the leading ends of the individual articles having the capability of diverting and removing articles for testing and inspection purposes. Subsequently, sanitary articles 11 are centrally revolved or swiveled by 90 degrees, so that their longitudinal axes now extend transversely to the direction of transport 12. The zones of the centers of gravity 11' of the sanitary articles maintain both the direction of production 12 and the transport speed up to this point as well as the article spacing d while the articles are being swiveled. After being swiveled, the sanitary articles pass through a pulling station 4, where they are briefly accelerated to a slightly higher speed and provided with a smaller article spacing interval d'. Thereafter, their transport speed is highly reduced in the regulating station 5, so that the article spacing interval is again lessened to d". The sanitary articles are simultaneously aligned in this process and subsequently loaded into compartment chain 6. With said compartment chain 6, the article transport speed is reduced further and their spacing interval reduced to d'''. On the lower strand 6' of compartment chain 6, sanitary articles 11 are finally ejected or pushed out of the chain in packs 14 comprised of counted numbers of units, and then conveyed further in the direction 13 or 13' by a transverse conveyor 9 to be delivered to the packaging station.

The following is a detailed description of the devices designated 2 to 10 given with the aid of FIGS. 1 and 3.

Product switch 2 is provided with lower transport belts 20 and 21 which form a gap 23 therebetween. A blow nozzle 24 is arranged above gap 23 with its orifice directed at the gap. A top conveyor belt 22 is arranged above transport belts 20 and 21 and is reversed within the zone above gap 23 in a way such that space is available for blow nozzle 24. When compressed air is admitted into blow nozzle 24, flawed sanitary articles 11 are blown into gap 23 and thereby deflected or diverted from the direction of production 12. When blow nozzle 24 is not activated with compressed air, sanitary articles 11 pass across gap 23 and thus remain aligned in the direction of production 12.

The revolving or swiveling device 3 is provided with a top transport chain 26 and a bottom transport chain 27, said chains being reversed at reversing points 28, 29 and 30, 31, respectively. Rotary dishes 32 and 33 are arranged on chains 26 and 27 with the spacing d. Rotary dishes 32 of top chain 26 are freely rotating, whereas rotary dishes 33 of bottom chain 27 are controlled via cams and driving means (not shown in the drawing) in such a way that they perform a desired 90° rotation in the direction of transport 12. Sanitary articles 11 arriving from product switch 2 are centrally chucked within the zone of their centers of gravity 11' between rotary dishes 32 and 33 and swiveled by 90 degrees while being further transported.

Pulling device 4 is comprised of a top transport chain 34 revolving around reversing points 36, 29 and 37 and a top belt 35 and a bottom belt 36, said belts being reversed at the points 38, 39 and 40, and points 41, 42 and 43, respectively. Sanitary articles 11 are received by top transport chain 34 from swiveling device 3 and transported by belts 35 and 36 to regulating device 5 at a slightly increased speed.

Regulating device 5 has two regulating chains 44 operating in synchronization revolving around the reversing points 43, 45 and 46. Drivers 47 are arranged on regulating chains 44 with the spacing d" and grip across the plane of transport 25 between reversing points 43 and 45. Sanitary articles 11 are greatly decelerated in regulating station 5 and transferred aligned to a compartment chain 6 with spacing d". Said compartment chain 6 revolves around reversing points 48, 49 and 50 and is comprised of chains 54 and 54' which are connected with each other by way of crossties 51. Drivers 52 of compartment chain 6 are secured on crossties 51. Crossties 51 and thus also drivers 52 are provided with spacing d'''. Pockets 53 are formed by the intermediate spaces between each of two drivers 52. Compartment chain 6 is designed to open its pockets 53 outwardly with each pass around reversing points 48, 49 and 50. This design is exploited at reversing point 48 in order to load the compartment chain with the sanitary articles delivered by regulating chain 44, so that each pocket 53 contains a single sanitary article 11. During loading of compartment chain 6, the transport speed of the sanitary articles is reduced further and the spacing d''' is adjusted between the individual articles. Compartment chain 6 may be intermittently driven in synchronization with the operating cycle of the machine by means of a clutch-and-brake combination (not shown in the drawing). A sensor 55 arranged above regulating station 5 scans the sanitary articles and controls the clutch-andbrake combination in such a way that compartment chain 6 is always completely loaded. This intermittent operation also allows for stopping the compartment chain to allow its complete loading. It is also possible to continuously drive compartment chain 6 in synchronization with the operating cycle of the machine. Compartment chain 6 transports sanitary articles 11 to ejecting device 7, which is arranged on both sides of lower chain strand 6'. A guide 56 cooperates with compartment chain 6 to prevent sanitary articles 11 from falling out of open pockets 53 at reversing point 50.

Ejecting or pushing device 7 is disposed on lower strand 6' of compartment chain 6 and is comprised of two controllable rotary wings 57 and 58 arranged on either side next to compartment chain 6. The axes 59 and 60 of rotary wings 57 and 58 extend parallel to lower strand 6' of compartment chain 6. Rotary wings 57 and 58 are designed with an approximately S-shaped or inverted S-shaped cross section. The ends of rotary wings 57 and 58 are angled in the direction of open rotary wing sides 57' and 58', forming in this way the lateral support guides 61 and 62 for supporting sanitary articles 11, which, in compartment chain 6, are downwardly suspended in order to be ejected, or pushed out of the chain. The closed sides 57" and 58" of rotary wings 57 and 58 serve to smoothly push sanitary articles 11 from the chain without damage to the product. For each action of ejection, rotary wings 57 and 58 are indexed by one half rotation in the direction of rotation 76 and 77, respectively. In this step, support guides 61 and 62 of the bottom halves of the rotary wings move away from sanitary articles 11 to be pushed out, whereas closed sides 57" and 58" of the other halves of the rotary wings push the sanitary articles 11 pack by pack downwardly and onto depositing station 8. Subsequently, newly arriving sanitary articles 11 are supported by guides 61 and 62 of open sides 57' and 58' of said wings. A sensor 63 arranged on the compartment chain 6 slightly upstream of pushing or ejecting device 7 counts the arriving sanitary articles 11 and, by means of a clutch-and-brake combination (not shown in the drawing) and a switchgear (not shown in the drawing), controls the pushing motion of rotary wings 57 and 58 and thereby also the ejection of packs 14 onto depositing station 8, said packs 14 being comprised of a preselectable complete number of units per pack.

Depositing station 8 is arranged beneath ejecting or pushing device 7 and compartment chain 6 and is comprised of a table 64 and the lateral guides 65 and 66.

Transverse conveyor 9 consists of two chains 67 and 68 running synchronously in parallel and connected with each other by means of crossties 69. Chains 67 and 68 revolve around the reversing points 70, 71, 72 and 73, respectively. Between reversing points 70 and 71, said crossties 69 extend across the table 64. Packs 14 pushed from the chain are engaged by the bars 69 and pushed across table 64 transversely to direction 12 for delivery to the packaging station.

Station 10 for receiving rejects is arranged below compartment chain 6 and its reversing point 48. Station 10 consists of a baffle plate 74 and a collecting container 75. Sanitary articles 11 not ejected at the depositing station 8 drop in said station from the open pockets 53 of the chain onto the baffle plate 74 and slide into the collecting container 75.

While only a single embodiment of the present invention has been shown and described, it will be obvious that many changes and modifications may be made thereunto without departing from the spirit and scope of the invention.

What is claimed is:

1. A method for delivering articles for packaging from a high-speed production machine for the manufacture of sanitary articles, such as sanitary napkins, tampons or the like, comprising the following steps:
    (a) centrally swiveling by means of a swiveling device the longitudinal axes of the articles by 90 degrees from the direction of production into a direction perpendicular to the direction of production so that said sanitary articles, with the zones of their centers of gravity, remain in the direction of production with no change in speed;
    (b) pulling the swiveled articles from said swiveling device;
    (c) reducing the spacing in the timed sequence and simultaneously aligning the now transversely disposed articles in a regulating device at greatly reduced transport speed;
    (d) loading the articles in a compartment chain and transferring the so loaded articles to a push-out position on the reversed lower strand of the compartment chain;
    (e) downwardly ejecting the articles from said compartment chain in packs of counted numbers onto a depositing table; and
    (f) transporting the packs of articles transversely to the direction of production from the depositing table to a packaging facility.

2. The method as defined in claim 1, wherein said articles are loaded in an intermittently driven compartment chain, said compartment chain being capable of stopping for complete loading of the chain.

3. The method as defined in claim 1, wherein said articles are loaded in a continuously driven compartment chain in synchronization with the operating cycle of the machine, and only packs containing a preselected complete number of articles are ejected onto the depositing table, whereas packs with an incomplete number of articles are received by an after-connected station for receiving rejects.

4. The method as defined in claim 1, which further comprises the step of transporting the articles by means of a switch which diverts and removes selected articles from the direction of production for testing or inspection purposes upstream from said regulating device.

5. The method as defined in claim 1, which further comprises the step of further reducing the spacing and speed of said articles by means of said compartment chain.

6. Apparatus for delivering articles for packaging from a high-speed production machine for the manufacture of sanitary articles, such as sanitary napkins, tampons or the like, comprising:
    (a) a swiveling device having a top and bottom chain driven synchronously with the speed of the production machine, said chains having rotating dishes arranged thereon with a spacing synchronized with the operating cycle of the production machine;
    (b) a pulling device for transporting the articles from the swiveling device;
    (c) a regulating device operating at a greatly reduced transport speed, said device having regulating chains and drivers arranged thereon with reduced spacings in the timed sequence, said reduced spacings in the timed sequence conforming to a lower transport speed;

(d) a revolving compartment chain rotating around horizontal reversing axles, said compartment chain consisting of two chains running in parallel and connected to each other by means of crossties, drivers being arranged on said crossties vertically to the plane of the chain, said drivers forming pockets for receiving the articles;

(e) a pushing device mounted on the reversed lower strand of the compartment chain with two controllable rotary wings arranged counter-rotatably and at right angles to said compartment chain with their axes of rotation extending parallel to said compartment chain, said rotary wings having an approximately S-shaped and inversely S-shaped cross section, whereby the articles are pushed from the compartment chain in counted numbers by closed sides of the rotary wings by the controlled rotary motion of said wings;

(f) a depositing table with a transverse conveying facility for receiving said articles in counted numbers from said rotary wings; and (g) a depositing station for receiving rejects, said station being comprised of a baffle plate and a collecting container.

7. The apparatus as defined in claim 6, wherein means are provided to drive said compartment chain intermittently in synchronization with the operating cycle of the machine, said means being capable of stopping said compartment chain for complete loading.

8. The apparatus as defined in claim 6, wherein the rotary wings of the pushing device are capable of being jointly advanced and subsequently returned during the action of ejection or push-out in the direction of transport of the lower strand of the compartment chain.

9. The apparatus as defined in claim 6, wherein angled guides are arranged on the open sides of the rotary wings, said guides serving to support the articles suspended downwardly in the compartment chain.

10. The apparatus as defined in claim 6, which further comprises a product switch having means for diverting and removing articles from the direction of production positioned upstream from said regulating device.

11. The apparatus as defined in claim 7, wherein said driving means comprises a transmission and a combined clutch-and-brake system.

12. The apparatus as defined in claim 6, wherein the drivers arranged on said compartment chain are spaced apart so as to further reduce the spacing and speed of said articles.

* * * * *